(12) United States Patent
Sato

(10) Patent No.: US 12,139,588 B2
(45) Date of Patent: Nov. 12, 2024

(54) LAMINATE, PRINTED MATTER, AQUEOUS DISPERSION LIQUID, AND LAMINATE MANUFACTURING METHOD

(71) Applicant: YUPO CORPORATION, Tokyo (JP)

(72) Inventor: Ryo Sato, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 0 days.

(21) Appl. No.: 18/284,116

(22) PCT Filed: Mar. 9, 2022

(86) PCT No.: PCT/JP2022/010431
§ 371 (c)(1),
(2) Date: Sep. 26, 2023

(87) PCT Pub. No.: WO2022/209684
PCT Pub. Date: Oct. 6, 2022

(65) Prior Publication Data
US 2024/0182658 A1    Jun. 6, 2024

(30) Foreign Application Priority Data

Mar. 31, 2021    (JP) ................................. 2021-061176

(51) Int. Cl.
*C08J 7/04*    (2020.01)
*B32B 27/08*    (2006.01)
(Continued)

(52) U.S. Cl.
CPC .............. *C08J 7/0427* (2020.01); *B32B 27/08* (2013.01); *B32B 27/20* (2013.01); *B32B 27/32* (2013.01);
(Continued)

(58) Field of Classification Search
CPC .................................................. B32B 2264/302
See application file for complete search history.

(56) References Cited

FOREIGN PATENT DOCUMENTS

JP    H11-333952 A    12/1999
JP    2001-131484 A    5/2001
(Continued)

OTHER PUBLICATIONS

International Search Report International Patent Application No. PCT/JP2022/010431, issued May 31, 2022, with English translation.
(Continued)

*Primary Examiner* — Ian A Rummel
(74) *Attorney, Agent, or Firm* — GREENBLUM & BERNSTEIN, P.L.C.

(57) ABSTRACT

The present invention provides a layered product comprising a release layer that can be formed from an aqueous coating liquid, that is quickly released from the substrate when alkaline treatment is performed, and that has excellent water resistance. The layered product of the present invention is a layered product comprising a release layer on a substrate, the release layer comprising a granular carboxylic anhydride-modified olefin resin and a binding part containing an acid group-free thermoplastic resin, the carboxylic anhydride-modified olefin resin having an average particle size of 0.5 to 20 µm, the binding part having a thickness of 0.25 to 20 µm, and the release layer having an actual acid value of 100 mg KOH/m² or more.

9 Claims, 1 Drawing Sheet

(51) Int. Cl.
  *B32B 27/20*  (2006.01)
  *B32B 27/32*  (2006.01)
  *C09D 5/00*  (2006.01)
  *C09D 123/22*  (2006.01)
  *C09D 135/02*  (2006.01)
(52) U.S. Cl.
  CPC ........... *C09D 5/008* (2013.01); *C09D 123/22* (2013.01); *C09D 135/02* (2013.01); *B32B 2250/03* (2013.01); *B32B 2250/242* (2013.01); *B32B 2250/40* (2013.01); *B32B 2255/10* (2013.01); *B32B 2255/26* (2013.01); *B32B 2264/104* (2013.01); *B32B 2270/00* (2013.01); *B32B 2307/516* (2013.01); *B32B 2307/538* (2013.01); *B32B 2307/554* (2013.01); *C08J 2323/12* (2013.01); *C08J 2423/22* (2013.01); *C08J 2425/14* (2013.01); *C08J 2435/02* (2013.01); *C08J 2475/04* (2013.01)

(56) References Cited

FOREIGN PATENT DOCUMENTS

| JP | 2001-261746 A | 9/2001 |
| JP | 2002-011819 A | 1/2002 |
| JP | 2003-084670 A | 3/2003 |
| JP | 2017-114930 A | 6/2017 |
| JP | 2018-052609 A | 4/2018 |

OTHER PUBLICATIONS

Written Opinion of the International Searching Authority Patent Application No. PCT/JP2022/010431, issued May 31, 2022.

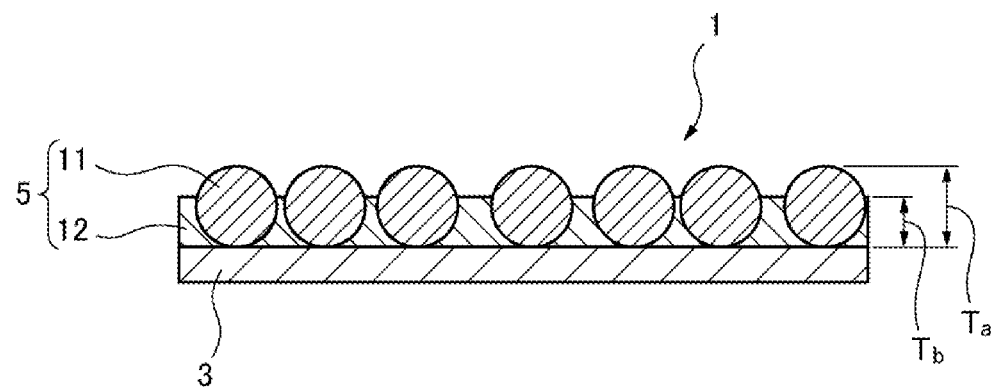

LAMINATE, PRINTED MATTER, AQUEOUS DISPERSION LIQUID, AND LAMINATE MANUFACTURING METHOD

TECHNICAL FIELD

The present invention relates to a layered product, a printed matter, an aqueous dispersion, and a method for producing the layered product, and more specifically relates to a layered product comprising a release layer on its surface, a printed matter comprising a printed layer on a surface of the layered product on the release layer side, an aqueous dispersion for forming the release layer, and a method for producing the layered product.

BACKGROUND ART

Plastics are used in an extremely wide variety of applications, such as containers and packaging bags. Many plastic products are printed on their surfaces to communicate information to general consumers and to manage product logistics.

Due to their difficulty in degradation in nature, resource saving, economic efficiency, etc., some plastics are separated and recovered, and some are recycled and used as secondary products. However, if plastic products with printing etc. are mixed during recycling, the recycled products will be entirely colored or partially colored, which limits the use of the recycled products and reduces their recyclability.

Therefore, a method for removing the printed ink (deinking) from printed plastic products has been conventionally considered. For example, a release layer that can be released by alkaline treatment is provided on the plastic surface, a printed layer is formed on the surface of the release layer, and when the product is recycled, the printed layer is removed together with the release layer by treatment with an alkaline aqueous solution.

For example, Patent Literature 1 discloses a label having an intermediate layer that removes ink in alkaline hot water between an ink layer and a substrate layer on at least one side of a thermoplastic polymer film.

Patent Literature 2 discloses an article having a releasable surface layer made of a material that becomes water-swellable or water-soluble by neutralization treatment, wherein the article is treated with an alkaline aqueous solution.

Patent Literature 3 discloses an alkali-releasable label in which an alkali-releasable layer is formed on a substrate, and a printed layer is formed on, or through an aluminum deposition layer, the alkali-releasable layer, wherein the resin composition used for the alkali-releasable layer is composed of a random, block, and/or graft copolymer comprising 20 to 90 wt % of a lower alkyl ester unit of carboxylic acid having a polymerizable unsaturated group, such as acrylic acid, 0.5 to 35 wt % of an acid component unit, such as acrylic acid, and 0.5 to 30 wt % of a cross-linkable component unit as monomer units, and 0.05 to 15 parts of a crosslinking agent component based on 100 parts of the copolymer.

Patent Literature 4 discloses an aqueous primer composition for forming a primer layer for removal of a printed matter comprising a polyester substrate, the primer layer for removal, and a printed layer in this order, wherein (1) the aqueous primer composition contains a polyurethane resin having a carboxyl group (A), (2) at least part of the carboxyl group in the polyurethane resin (A) is neutralized with an amine compound (a-1), and (3) the polyurethane resin (A) before neutralization has an acid value of 25 to 45 mgKOH/g.

CITATION LIST

Patent Literature

Patent Literature 1: JPH11-333952A
Patent Literature 2: JP2001-131484A
Patent Literature 3: JP2002-11819A
Patent Literature 4: JP2017-114930A

SUMMARY OF INVENTION

Technical Problem

In the label disclosed in Patent Literature 1, the ink layer is removed by treatment with a hot alkaline aqueous solution at 90° C. or more, and work efficiency during recycling is low. Regarding the article having a releasable surface layer disclosed in Patent Literature 2, work efficiency during recycling is also low because it is necessary to heat the treatment solution to 70 to 80° C. In addition, ethyl acetate is used as the coating liquid for forming the release layer, and treatment is required to dispose of wastewater recovered after the removal of the printed layer. As for the alkali-releasable label disclosed in Patent Literature 3, an organic solvent is used as the coating liquid for forming the alkali-releasable layer, and no consideration is given to addressing environmental issues.

The technique of Patent Literature 4 uses an aqueous coating liquid as the coating liquid for the release layer, solubility in water is improved by neutralizing at least part of the carboxyl group in the polyurethane resin (A) contained in the coating liquid, and it is used as an aqueous solution; however, the obtained primer layer for removal had insufficient water resistance.

The present invention has been made in view of the above problems, and an object thereof is to provide a layered product comprising a release layer that can be formed from an aqueous coating liquid, that is quickly released from the substrate when alkaline treatment is performed, and that has excellent water resistance.

Solution to Problem

As a result of extensive research on the aqueous coating liquid for forming the release layer, the present inventor has found that a release layer formed from an aqueous dispersion obtained by dispersing a granular alkali-soluble resin in an aqueous medium can achieve both the improvement of releasability from the substrate and the improvement of water resistance, and has further found its optimal form. Thus, the present invention has been completed.

The present invention relates to the following (1) to (11).
(1) A layered product comprising a release layer on a substrate,
the release layer comprising a granular carboxylic anhydride-modified olefin resin and a binding part containing an acid group-free thermoplastic resin,
the carboxylic anhydride-modified olefin resin having an average particle size of 0.5 to 20 μm, the binding part having a thickness of 0.25 to 20 μm, and the release layer having an actual acid value of 100 mg KOH/m$^2$ or more.

(2) The layered product according to (1) above, wherein an acid value when the carboxylic anhydride-modified olefin resin is ring-opened by hydrolysis is 400 mg KOH/g or more.

(3) The layered product according to (1) or (2) above, wherein the proportion of the carboxylic anhydride-modified olefin resin in the release layer is 5 to 75 mass %.

(4) The layered product according to any one of (1) to (3) above, wherein the thickness of the binding part relative to the average particle size of the carboxylic anhydride-modified olefin resin is 0.1 times or more.

(5) The layered product according to any one of (1) to (4) above, wherein the substrate comprises a polyolefin resin.

(6) The layered product according to any one of (1) to (5) above, wherein the thermoplastic resin is a water-soluble polymer or a water-dispersible polymer.

(7) The layered product according to any one of (1) to (6) above, which is in the form of a film.

(8) A printed matter having a printed layer on the release layer of the layered product according to any one of (1) to (7) above.

(9) An aqueous dispersion for forming a release layer in a printed matter having a substrate, the release layer, and a printed layer, the aqueous dispersion comprising a granular carboxylic anhydride-modified olefin resin and an acid group-free thermoplastic resin, the carboxylic anhydride-modified olefin resin having an average particle size of 0.5 to 20 μm, and the formed release layer having an actual acid value of 100 mg KOH/m$^2$ or more.

(10) The aqueous dispersion according to (9) above, wherein an acid value when the carboxylic anhydride-modified olefin resin is ring-opened by hydrolysis is 400 mg KOH/g or more.

(11) A method for producing a layered product comprising a release layer on a substrate, the method comprising a step of applying the aqueous dispersion according to (9) or (10) above to the substrate, followed by drying to form the release layer.

Advantageous Effects of Invention

According to the present invention, it is possible to provide a layered product comprising a release layer that is quickly released from the substrate when alkaline treatment is performed, and that has excellent water resistance. Further, since the coating liquid is an aqueous dispersion, the layered product has excellent environmental conservation.

BRIEF DESCRIPTION OF DRAWING

The FIGURE is a cross-sectional view showing the structure of the layered product of the present invention.

DESCRIPTION OF EMBODIMENTS

The present invention will be described below; however, the present invention is not limited by the examples in the following description.

In the present specification, "mass" is synonymous with "weight".

As shown in the FIGURE, the layered product 1 of the present invention comprises a release layer 5 on a substrate 3, and the release layer 5 comprises a granular carboxylic anhydride-modified olefin resin 11 and a binding part 12 containing an acid group-free thermoplastic resin. In the present invention, the average particle size $T_a$ of the carboxylic anhydride-modified olefin resin 11 is 0.5 to 20 μm, the thickness $T_b$ of the binding part 12 is 0.25 to 20 μm, and the actual acid value of the release layer 5 is 100 mg KOH/m$^2$ or more.

The structure of the release layer of the layered product of the present invention can be confirmed by observing the cross section of the layered product including the release layer with a scanning electron microscope.

Substrate

The substrate 3 on which the release layer 5 is formed is a member that forms an article, and is not particularly limited. Examples include thermoplastic resin molded articles, thermosetting resin molded articles, and non-woven fabrics. Of these, thermoplastic resin molded articles can be suitably used because of their high demand for recycling.

The thermoplastic resin that forms the thermoplastic resin molded article is not particularly limited. Examples include polyolefin resins, polyester resins, polyamide resins, polystyrene resins, polyethylene terephthalate resins, polyvinyl chloride resins, and polycarbonate resins. Examples of polyolefin resins include polyethylene (low density, medium density, and high density), polypropylene, polymethylpentene, polybutene, ethylene-propylene copolymers, and ethylene-vinyl acetate copolymers. These may be used singly or in combination of two or more.

Of these, polyolefin resins are preferred, in terms of the adhesion to the release layer.

The shape of the substrate is not particularly limited, and is, for example, a shape mainly composed of a flat surface, such as a film or plate, or any three-dimensional shape combining a flat surface and a curved surface. Of these, in terms of ease of handling, it is preferable to use a film-like substrate.

The film-like substrate may be in the form of a roll or a sheet.

The size of the substrate is also not particularly limited. For example, when the substrate is in the form of a film, the thickness thereof is preferably 50 μm or more, more preferably 60 μm or more, and even more preferably 70 μm or more, in terms of obtaining excellent film strength. Further, in terms of obtaining excellent flexibility, the thickness of the substrate is preferably 300 μm or less, more preferably 200 μm or less, and even more preferably 100 μm or less.

Release Layer

The release layer 5 comprises a granular carboxylic anhydride-modified olefin resin 1 and a binding part 12 containing an acid group-free thermoplastic resin, as described above.

Since the carboxylic anhydride-modified olefin resin is soluble in alkali, the release layer contains the carboxylic anhydride-modified olefin resin in plural, so that the layered product has water resistance, and when the layered product is subjected to alkaline treatment, alkali releasability can be exhibited. Further, since the carboxylic anhydride-modified olefin resin is contained in the form of particles in the release layer, the coating liquid for forming the release layer can be water-based. In addition, since the release layer contains a binding part containing an acid group-free thermoplastic resin, the carboxylic anhydride-modified olefin resin can be retained on the substrate, the adhesion when a printed layer is provided on the release layer is improved, and printability is imparted to the release layer surface.

The carboxylic anhydride-modified olefin resin is a compound having an acid anhydride group as a functional group. The carboxylic anhydride of the carboxylic anhydride-modified olefin resin used in the present invention is preferably one or a mixture of two or more selected from the group consisting of acid anhydrides of α,β-unsaturated dicarboxylic acids, such as maleic acid, fumaric acid, and itaconic acid, and particularly preferably maleic anhydride. The carboxylic anhydride-modified olefin resin used in the present invention is preferably a copolymer of any of these acid anhydrides and one or a mixture of two or more selected from the group consisting of ethylene, propylene, butene, and styrene. Of these, a copolymer with isobutene (isobutylene) or styrene is particularly preferred.

In the present invention, the acid value when the carboxylic anhydride-modified olefin resin is ring-opened by hydrolysis is preferably 400 mg KOH/g or more. When the acid value is 400 mg KOH/g or more, the release layer is quickly released from the substrate when the layered product is subjected to alkaline treatment.

The acid value is more preferably 500 mg KOH/g or more, and even more preferably 600 mg KOH/g or more. If the acid value is overly high, the amount of alkali necessary for alkaline treatment increases; thus, the acid value is preferably 800 mg KOH/g or less.

The shape of the granular carboxylic anhydride-modified olefin resin is, for example, spherical (perfectly spherical, nearly spherical, ellipsoidal, etc.), polyhedral, rod-like (cylindrical, prismatic, etc.), tabular, irregular, or the like. Of these, spherical and tabular shapes are preferred, in terms of the prevention of particle dropout from the release layer and ink fixing performance.

The average particle size $T_a$ of the carboxylic anhydride-modified olefin resin is 0.5 to 20 µm, and depends on the size of the carboxylic anhydride-modified olefin resin as a raw material. When the average particle size $T_a$ is 0.5 µm or more, sufficient alkali releasability is exhibited, and the increase in the viscosity of the coating liquid can be suppressed in the formation of the release layer, which ensures good workability. Further, when the average particle size $T_a$ is 20 µm or less, the specific surface area of the carboxylic anhydride-modified olefin resin in the release layer can be increased, thereby improving alkali releasability.

The average particle size $T_a$ of the carboxylic anhydride-modified olefin resin is preferably 1 µm or more, and more preferably 2 µm or more, and is preferably 15 µm or less, and more preferably 10 µm or less.

The proportion of the carboxylic anhydride-modified olefin resin in the release layer may be appropriately adjusted so that the actual acid value is within the range of the present invention depending on the acid value when the carboxylic anhydride-modified olefin resin is ring-opened by hydrolysis, but is preferably 5 to 75 mass %. When the proportion of the carboxylic anhydride-modified olefin resin is 5 mass % or more, alkali releasability is easily exhibited, and when the proportion of the carboxylic anhydride-modified olefin resin is 75 mass % or less, the adhesion between the release layer and the substrate is easily maintained. In the release layer, the carboxylic anhydride-modified olefin resin is more preferably contained in an amount of 20 mass % or more, and even more preferably 40 mass % or more, and more preferably contained in an amount of 70 mass % or less, and even more preferably 65 mass % or less.

The binding part plays the role of retaining the carboxylic anhydride-modified olefin resin on the substrate and capturing the ink or toner printed on the surface of the layered product. The binding part contains at least an acid group-free thermoplastic resin as a binder resin.

As the acid group-free thermoplastic resin, any resin that does not have an acid group can be used without particular limitation; however, a water-soluble polymer or a water-dispersible polymer is preferred. The water-soluble polymer or water-dispersible polymer is preferably cationic. Of these, the cationic water-dispersible polymer is more preferred. In the present specification, the cationic water-soluble polymer or cationic water-dispersible polymer is also referred to as the cationic water-soluble polymer or water-dispersible polymer.

Due to the polar group of the cationic water-soluble polymer or water-dispersible polymer, the binding part can be chemically attached (specifically attached by ionic bonding) and dispersion-attached (specifically attached by van der Waals forces) to the ink or toner, and it is assumed that the transferability and adhesion of the ink or toner to the release layer are improved.

The water solubility of the cationic water-soluble polymer may be such that when preparing a coating liquid for forming the release layer, the aqueous medium containing the cationic water-soluble polymer is in a solution state.

Usable examples of the cationic water-soluble polymer or water-dispersible polymer include a (meth)acrylic polymer having an amino group or an ammonium salt structure, a urethane polymer, an ethyleneimine polymer, a water-soluble polymer having a phosphonium salt structure, and a vinyl polymer obtained by cationizing a water-soluble polymer, such as polyvinylpyrrolidone or polyvinyl alcohol, by modification. These can be used singly or in combination of two or more.

Of these, the urethane polymer is preferred, in terms of the releasability of the release layer when the layered product is subjected to alkaline treatment. In terms of the transferability and adhesion of the ink or toner to the release layer, the (meth)acrylic polymer having an amino group or an ammonium salt structure or the ethyleneimine polymer is preferred.

Examples of the urethane polymer include cation-modified urethane resins, cationic ether-based urethane resins, cationic carbonate-based urethane resins, cationic ester-based urethane resins, and other cationic urethane resins. In terms of excellent releasability of the release layer, cationic ester-based urethane resins are preferred.

A commercial product can also be used as the urethane polymer.

Commercial products of the urethane polymer include the "Superflex" series of DKS Co., Ltd., the "WBR" series and "WEM" series of Taisei Fine Chemical Co., Ltd.

In terms of improving releasability when alkaline treatment is performed, the glass transition temperature (Tg) of the urethane polymer is preferably −30° C. or more, and more preferably −10° C. or more. On the other hand, in terms of the adhesion to the substrate, the glass transition temperature (Tg) is preferably 60° ° C. or less, and more preferably 45° C. or less.

In terms of safety, the (meth)acrylic polymer having an amino group or an ammonium salt structure or the ethyleneimine polymer preferably has a primary to tertiary amino group or an ammonium salt structure, more preferably a secondary to tertiary amino group or an ammonium salt structure, and even more preferably a tertiary amino group or an ammonium salt structure.

Of these, the ethyleneimine polymer has high affinity with the ink or toner used in various printing methods, particularly UV-curable ink used in flexographic printing methods; thus, the adhesion between the release layer and the ink is improved, which is preferable.

Examples of the ethyleneimine polymer include polyethyleneimine, poly(ethyleneimine-urea), ethyleneimine adducts of polyamine polyamides, their alkyl-modified products, cycloalkyl-modified products, aryl-modified products, allyl-modified products, aralkyl-modified products, benzyl-modified products, cyclopentyl-modified products, cycloaliphatic hydrocarbon-modified products, glycidol-modified products, and their hydroxides. Examples of modifier for obtaining modified products include methyl chloride, methyl bromide, n-butyl chloride, lauryl chloride, stearyl iodide, oleyl chloride, cyclohexyl chloride, benzyl chloride, allyl chloride, and cyclopentyl chloride.

Of these, an ethyleneimine polymer represented by the following formula (I) is preferred, in terms of improving the transferability and adhesion of the ink or toner used for printing, particularly UV-curable ink.

[Chemical Formula 1]

(I)

[In the above formula (I), $R^1$ and $R^2$ each independently represent a hydrogen atom, a $C_{1-12}$ linear or branched alkyl group, or a $C_{6-12}$ alkyl group or aryl group having an alicyclic structure. $R^3$ represents a hydrogen atom, a $C_{1-18}$ alkyl group or allyl group optionally containing a hydroxy group, or a $C_{6-12}$ alkyl group or aryl group having an alicyclic structure and optionally containing a hydroxy group. m represents an integer of 2 to 6, and n represents an integer of 20 to 3000.]

As the (meth)acrylic polymer having an amino group or an ammonium salt structure or the ethyleneimine polymer, a commercial product can also be used.

Commercial products of the (meth)acrylic polymer having an amino group or an ammonium salt structure include "Polyment" produced by Nippon Shokubai Co., Ltd.

Further, commercial products of the ethyleneimine polymer include "Epomin" produced by Nippon Shokubai Co., Ltd., and "Polymin SK" produced by BASF.

In the (meth)acrylic polymer having an amino group or an ammonium salt structure or the ethyleneimine polymer, in terms of improving the adhesion to the substrate and the adhesion to the ink etc., the lower limit of the weight average molecular weight is preferably 10,000, and more preferably 20,000. On the other hand, the upper limit of the weight average molecular weight is preferably 1,000,000, and more preferably 500,000.

In order for the acid group-free thermoplastic resin to act as a binder, it is necessary to have suitable stickiness. If the glass transition temperature (Tg) of the acid group-free thermoplastic resin is overly low; the layered product surface is sticky, and a phenomenon called blocking, where overlapping layered products stick to each other, tends to occur frequently; thus, the glass transition temperature (Tg) is preferably −30° C. or more. Further, if the glass transition temperature (Tg) of the acid group-free thermoplastic resin is overly high, the acid group-free thermoplastic resin may be too hard, and the adhesion to the substrate, carboxylic anhydride-modified olefin resin, ink, etc. may be reduced; thus, the glass transition temperature (Tg) is preferably 80° C. or less.

The glass transition temperature (Tg) of the acid group-free thermoplastic resin is more preferably −10° C. or more, in order to function well as a binder, and the upper limit is more preferably 60° C. or less, and even more preferably 45° C. or less.

The binding part preferably contains the acid group-free thermoplastic resin at a ratio of 60 mass % or more. When the content of the acid group-free thermoplastic resin in the binding part is 60 mass % or more, the adhesion of the ink or toner to the release layer is improved. The content of the acid group-free thermoplastic resin in the binding part is more preferably 65 mass % or more, and even more preferably 70 mass % or more. Further, the upper limit is not particularly limited and may be 100 mass %, but is preferably 90 mass % or less, more preferably 85 mass % or less, and even more preferably 80 mass % or less.

The binding part may contain components other than acid group-free thermoplastic resin as long as the effects of the present invention are not impaired.

Examples of other components include silane coupling agents, antistatic agents, crosslinking accelerators, anti-blocking agents, pH adjusters, antifoaming agents, dispersants, wetting agents, emulsifiers, thickeners, anti-settling agents, anti-sagging agents, leveling agents, desiccants, plasticizers, rust inhibitors, antibacterial agents, insecticides, preservatives, light stabilizers, UV absorbers, and conductivity-imparting agents.

The proportion of the binding part in the release layer is preferably 25 to 95 mass %. When the proportion of the binding part is 25 mass % or more, the carboxylic anhydride-modified olefin resin can be retained without being dropped off from the substrate. When the proportion of the binding part is 95 mass % or less, the carboxylic anhydride-modified olefin resin does not impair alkali releasability.

The release layer more preferably contains the binding part in an amount of 30 mass % or more, and even more preferably 35 mass % or more, and more preferably in an amount of 80 mass % or less, and even more preferably 60 mass % or less.

In the layered product of the present invention, the thickness $T_b$ of the binding part is 0.25 to 20 μm. When the thickness $T_b$ of the binding part is 0.25 μm or more, it is easy to prevent dropout of the granular carboxylic anhydride-modified olefin resin from the release layer, and when the thickness $T_b$ of the binding part is 20 μm or less, productivity can be improved, and a cost increase can be suppressed.

The thickness $T_b$ of the binding part is more preferably 0.5 μm or more, and even more preferably 1 μm or more, and is more preferably 15 μm or less, and even more preferably 10 μm or less.

The thickness $T_b$ of the binding part relative to the average particle size $T_a$ of the granular carboxylic anhydride-modified olefin resin ($T_b/T_a$) is preferably 0.1 times or more. When the thickness $T_b$ of the binding part is 0.1 times or more the average particle size $T_a$ of the carboxylic anhydride-modified olefin resin, retention of the carboxylic anhydride-modified olefin resin on the substrate is enhanced.

The thickness $T_b$ of the binding part relative to the average particle size $T_a$ of the granular carboxylic anhydride-modified olefin resin ($T_b/T_a$) is more preferably 0.2 times or more, and even more preferably 0.5 times or more. Further, in terms of the alkali solubility of the release layer, it is preferably 3 times or less, more preferably 2 times or less, and even more preferably 1.2 times or less because the alkali solubility of the release layer is further enhanced when the particles of the carboxylic anhydride-modified olefin resin are present in the vicinity of the surface of the binding part.

In the layered product of the present invention, the actual acid value of the release layer is preferably 100 mg KOH/m$^2$ or more.

The "actual acid value" refers to the acid value per unit area of the release layer calculated from the actual amount of the carboxylic anhydride-modified olefin resin contained in the release layer and the acid value of the carboxylic anhydride-modified olefin resin.

When the grammage of the release layer is X (g/m$^2$), the content of the carboxylic anhydride-modified olefin resin in the release layer is Y (mass %), and the acid value when the carboxylic anhydride-modified olefin resin is ring-opened by hydrolysis is Z (mg KOH/g), the actual acid value of the release layer is represented by the following formula.

$$\text{Actual acid value (mg KOH/m}^2) = X \times 0.01 Y \times Z$$

The acid value when the carboxylic anhydride-modified olefin resin is ring-opened by hydrolysis can be measured by the neutralization titration method according to JIS K 0070-1992 "Test methods for acid value, saponification value, ester value, iodine value, hydroxyl value and unsaponifiable matter of chemical products".

The alkali releasability is improved as the actual acid value of the release layer increases; however, when the acid value is less than 100 mg KOH/m$^2$, the desired effects of the present invention can be hardly obtained. Thus, the actual acid value is preferably 100 mg KOH/m$^2$ or more. The actual acid value is more preferably 400 mg KOH/m$^2$ or more. Although the upper limit is not particularly limited, if the actual acid value is overly high, the amount of alkali necessary for alkaline release treatment increases. Therefore, the actual acid value is preferably 3000 mg KOH/m$^2$ or less, more preferably 2000 mg KOH/m$^2$ or less, and even more preferably 1500 mg KOH/m$^2$ or less.

The shape of the layered product of the present invention is according to the shape of the substrate, and is not particularly limited. Examples include shapes mainly composed of flat surfaces, such as films or plates, and any three-dimensional shapes combining flat surfaces and curved surfaces.

Of these, a film-like layered product is preferred, in terms of ease of handling and moldability.

Method for Producing Layered Product

The method for producing layered product of the present invention comprises applying an aqueous dispersion for forming a release layer to a substrate, followed by drying, thereby forming the release layer.

The aqueous dispersion used in the production of the layered product contains a granular carboxylic anhydride-modified olefin resin and an acid group-free thermoplastic resin, and can be prepared by dissolving or dispersing the carboxylic anhydride-modified olefin resin, the acid group-free thermoplastic resin, and optionally any components in an aqueous solvent.

The aqueous solvent may be water or a water-soluble organic solvent containing water as a main component, such as methyl alcohol, ethyl alcohol, isopropyl alcohol, acetone, methyl ethyl ketone, ethyl acetate, toluene, or xylene. Containing water as a main component means that 50 mass % or more of the entire solvent is water. The use of an aqueous solvent facilitates process control, and is preferred in terms of safety.

The carboxylic anhydride-modified olefin resin, the acid group-free thermoplastic resin, and other optional components are as described above, and preferred examples thereof are also the same as above.

Among the solids in the aqueous dispersion, the content of the carboxylic anhydride-modified olefin resin is preferably 5 to 75 mass %. When the content of the carboxylic anhydride-modified olefin resin is within the above range, alkali releasability and adhesion can both be achieved.

Among the solids in the aqueous dispersion, the content of the carboxylic anhydride-modified olefin resin is more preferably 20 mass % or more, and even more preferably 40 mass % or more, and is more preferably 70 mass % or less, and even more preferably 65 mass % or less.

Further, among the solids in the aqueous dispersion, the content of the acid group-free thermoplastic resin may be such that the content of the carboxylic anhydride-modified olefin resin is within the above range.

The aqueous dispersion of the present invention is configured such that when a release layer is formed, the actual acid value of the release layer is 100 mg KOH/m$^2$ or more.

The actual acid value can be set within the above range by, for example, adjusting the content of the carboxylic anhydride-modified olefin resin, or adjusting the acid value when the carboxylic anhydride-modified olefin resin is ring-opened by hydrolysis.

When the solids concentration is 20 mass %, the aqueous dispersion preferably has a viscosity at 20° C. of 5 to 200 mPa·s. If the viscosity is overly low, dispersoids tend to precipitate in the aqueous dispersion, and aggregates tend to be formed; thus, when applying the release layer, uniform application may not be possible. If the viscosity is overly high, it may not be possible to stably apply a low coating mass.

The viscosity of the aqueous dispersion is more preferably 15 mPa·s or more, and even more preferably 20 mPa·s or more, and is more preferably 150 mPa·s or less, and even more preferably 120 mPa·s or less.

The viscosity is measured by a B-type viscometer at a rotational speed of 60 rpm.

Application of the aqueous dispersion and drying of the coating film may be performed in-line or off-line in accordance with the molding of the substrate.

For the application of the aqueous dispersion, a coating device, such as a die coater, a bar coater, a roll coater, a lip coater, a gravure coater, a spray coater, a blade coater, a reverse coater, or an air knife coater, can be used.

The coating amount of the aqueous dispersion can be appropriately adjusted in consideration of the thickness of the release layer after drying, the concentrations of the components, and the like.

For the drying of the coating film, a drying device, such as a hot air blower or an infrared dryer, can be used. Drying may be performed at room temperature or by heating. In the case of heating, drying is preferably performed at 40 to 200° C., and more preferably 60 to 150° C.

By drying the coating film, the acid group-free thermoplastic resin is melted to form a film, thereby forming a release layer that holds the carboxylic anhydride-modified olefin resin on the substrate.

Printed Matter

The printed matter of the present invention comprises a printed layer on the release layer of the layered product of the present invention, and is obtained by forming the printed layer on the release layer.

The printed layer is a layer composed of text, images, and the like formed with a printing ink or toner.

The printed layer is located on a surface of the layered product of the present invention on the release layer side, and may cover at least a partial region of the release layer surface or may cover the entire region.

Various printing methods, such as offset printing, an ink jet method, an electrophotographic (laser) method, a thermal recording method, and a thermal transfer method, can be used as the printing method, and various coating devices, such as a die coater and a bar coater, described above, can be used.

Method for Releasing Printed Layer

In order to release (remove) the release layer and the printed layer from the printed matter, the printed matter is brought into contact with an alkaline aqueous solution.

Examples of the alkaline aqueous solution include an aqueous sodium hydroxide solution, an aqueous potassium hydroxide solution, ammonia water, barium hydroxide, and calcium hydroxide.

The concentration of the alkaline aqueous solution may be appropriately adjusted depending on the printed form of the printed matter, the treatment time, and the like, but is preferably within the range of 0.5 to 15 mass %, and more preferably 1 to 5 mass %.

Since the concentration of the alkaline aqueous solution is within the above range, the alkaline aqueous solution can maintain sufficient alkalinity for release, and is also suitable for penetrating through the printed matter and the layered product cross section and being compatible with the release layer, thus allowing the ink to be released in a shorter time.

In addition, in terms of environmental friendliness and waste liquid handling in the recycling process, the concentration of the alkaline aqueous solution is more preferably 5% or less.

The amount of the alkaline aqueous solution used is preferably 100 to 1 million times the mass of the printed matter or layered product. When the amount of the alkaline aqueous solution used is 100 times or more the mass of the printed matter or layered product, the alkali release effect of the release layer is sufficiently obtained. Even if an excessive amount of the alkaline aqueous solution is used, the release effect no longer changes; thus, the amount of the alkaline aqueous solution is preferably 1 million times or less the mass of the printed matter or layered product.

The amount of the alkaline aqueous solution used is more preferably 200 times or more, and even more preferably 300 times or more, and is more preferably 10000 times or less, and even more preferably 5000 times or less, the mass of the printed matter or layered product.

The temperature of the alkaline aqueous solution during treatment is preferably room temperature to 90° C. Specifically, the temperature of the alkaline aqueous solution is preferably 20° C. or more, and more preferably 30° C. or more. Further, in terms of treatment efficiency, the temperature of the alkaline aqueous solution is more preferably 70° C. or less, even more preferably 65° C. or less, and particularly preferably 60° C. or less.

The method for bringing the printed matter or layered product into contact with an alkaline aqueous solution is not particularly limited; however, in terms of the efficiency of the alkaline release treatment, immersion in the alkaline aqueous solution is preferred. By immersion in the alkaline aqueous solution, the entire printed matter or layered product is brought into contact with the alkaline aqueous solution, which ensures efficient treatment.

The immersion time may be appropriately adjusted depending on the printed form of the printed matter, but is preferably 1 minute to 24 hours, and more preferably 1 minute to 12 hours.

Specifically, when the printed matter is in the form of surface printing, the concentration of the alkaline aqueous solution is preferably 0.5 to 15 mass %, the immersion temperature is preferably 30 to 70° C., and the immersion time is preferably 1 to 12 hours.

When the printed matter is in the form of back printing (laminate form), the concentration of the alkaline aqueous solution is preferably 1 to 15 mass %, the immersion temperature is preferably 30 to 70° C., and the immersion time is preferably 1 to 12 hours.

The alkaline treatment is followed by water washing and drying, thereby obtaining an article from which the printed matter has been removed (deinked).

In the present invention, the removal percentage of the printed layer is preferably 90% or more, more preferably 95% or more, and even more preferably 98% or more.

When removing the printed layer from the printed matter, circulatory flushing or grinding and stirring of the printed matter or layered product may be performed for the improvement of efficiency.

Due to the use of the layered product of the present invention, in the printed matter comprising a printed layer on the surface (release layer-side surface) of the layered product, the printed layer can be removed in an alkaline aqueous solution, followed by water washing and drying, thereby obtaining a recycled substrate. When the recycled substrate is a thermoplastic resin, it can be recycled into pellets by an extruder and used.

EXAMPLES

The present invention will be described in more detail below with reference to Examples; however, the present invention is not limited thereto. Unless otherwise specified, "parts" and "%" represent "parts by mass" and "mass %," respectively.

Evaluation Method

The evaluation of layered products obtained in the following Examples and Comparative Examples is shown below.

1. Calculation of Actual Acid Value of Release Layer

The acid value of the carboxylic anhydride-modified olefin resin in the release layer was measured by the neutralization titration method according to JIS K 0070-1992 "Test methods for acid value, saponification value, ester value, iodine value, hydroxyl value and unsaponifiable matter of chemical products", and the actual acid value (acid value per unit area of the release layer) was calculated based on the following calculation formula.

$$\text{Actual acid value (mg KOH/m}^2\text{)} = X \times 0.01 Y \times Z$$

(In the above formula, X is the grammage (g/m$^2$) of the release layer, Y is the content (mass %) of the carboxylic anhydride-modified olefin resin in the release layer, and Z is the acid value (mg KOH/g) of the carboxylic anhydride-modified olefin resin.)

2. Film Thickness of Binding Part

Using a scanning electron microscope, the cross section of the layered product was observed at a magnification of 5000, and the film thickness of the binding part was measured from the obtained image.

3. Surface Roughness SRa

Using a contact type surface roughness measuring instrument SURFCOM 1500DX2, produced by Tokyo Seimitsu Co., Ltd., the center surface average roughness (SRa) of the layered product was measured according to JIS B0601-1982. The cut-off was 0.8 mm, the measurement length was 5 mm, the scanning pitch was 20 µm, and the number of scans was 30.

4. Deinking Properties (Alkali Releasability)

The layered products obtained in the Examples and Comparative Examples were each cut to A2 size (420 mm×594 mm), and a pattern including design etc. was offset-printed on the release layer surface. For printing, an offset printer (product name: SM102, produced by Heidelberg) and an oxidation polymerization type sheet-fed process ink (product name: Fusion G (black, indigo, red, and yellow), produced by DIC Corporation) were used. The pattern was printed in four colors, i.e., black, indigo, red, and yellow, and the density of each color was 100%. Specifically, 1000 sheets were printed continuously in an environment at a temperature of 23° C. with a relative humidity of 50% at a speed of 8000 sheets/hour to obtain off-set printed matters.

The obtained printed matters were used to perform the following evaluation.

50 printed matters cut into a size of 5 mm long×5 mm wide were immersed in 100 g of an alkaline aqueous solution (sodium hydroxide) with a concentration of 2%, and the water temperature was set to 20° C. or 40° C.

Using BLW1200, produced by Shinto Scientific Co., Ltd., stirring was started at a stirring speed of 1000 rpm, and stirring was performed for 20 minutes.

After stirring, the resultant was washed with water and dried, the surface was observed with a Digital Microscope HRX-01, produced by Hirox Co., Ltd., and the area of the portion from which the printed layer was removed was measured to calculate the removal percentage, and evaluated according to the following evaluation criteria.

Evaluation Criteria

A (good): a removal percentage of 95% or more
B (acceptable): a removal percentage of 70% or more and less than 95%
C (unacceptable): a removal percentage of less than 70%

5. Water Resistance

The printed matter obtained in the item "4. Deinking Properties (Alkali Releasability)" above was immersed in water at 23° C. for 24 hours, and then taken out from the water, and the moisture on the printed surface was lightly wiped off with a waste cloth. After 10 minutes, cellophane tape produced by Nichiban Co., Ltd. cut to a length of 5 cm was bonded to the printed surface, and 2.5 cm of the tape was peeled off by hand at low speed (2.5 cm/s) and the remaining 2.5 cm at high speed (25 cm/s).

After peeling, the degree of peeling of the printed part was visually observed, and the ink adhesion in a wet state was evaluated according to the following evaluation criteria. A score of 3 or more is acceptable, and a score of 2 or less is unacceptable.

Evaluation Criteria

5: No peeling at both low and high speeds.
4: No peeling at low speed, but partial peeling at high speed (less than 50% of the entire high-speed peel surface).
3: No peeling at low speed, but entire peeling at high speed (50% or more of the entire high-speed peel surface).
2: Partial peeling at low speed (less than 50% of the entire low-speed peel surface), and entire peeling at high speed (50% or more of the entire high-speed peel surface).
1: Entire peeling at both low and high speeds.

Raw Materials Used

The raw materials used in the Examples and Comparative Example are as shown below.

Carboxylic Anhydride-Modified Olefin Resins

Isobutylene maleic anhydride copolymer ("Isobam-04" (product name), produced by Kuraray Co., Ltd., molecular weight: 55,000 to 65,000, acid value: 728 mg KOH/g)
Styrene maleic anhydride copolymer ("XIRAN 1000P" (product name), produced by Polyscope, molecular weight: 5000, copolymerization ratio of styrene to maleic anhydride=1:1, acid value: 475 mg KOH/g)

Thermoplastic Resin

Cation-modified urethane resin ("Superflex 620" (product name), produced by DKS Co., Ltd., non-yellowing isocyanate ester type)

Production Example 1: Production of Substrate (I) 55 mass % of a propylene homopolymer (product name: Novatec PP FY6Q, produced by Japan Polypropylene Corporation), 12 mass % of a propylene homopolymer (product name: Novatec PP MA3Q, produced by Japan Polypropylene Corporation), 10 mass % of high-density polyethylene resin (product name: Novatec HD HJ580N, produced by Japan Polyethylene Corporation), and 23 mass % of heavy calcium carbonate particles (product name: Softon 1800, produced by Bihoku Funka Kogyo Co., Ltd.) were mixed to prepare a resin composition a.

(II) Then, the resin composition a was melted and kneaded in an extruder set at 270° C., and extruded in a sheet form from the die. The sheet was cooled by a cooling roll to obtain an unstretched sheet. The unstretched sheet was heated again to 150° C., and then stretched 4.8 times in the sheet flow direction (MD) by using the speed difference between rolls to obtain a longitudinally uniaxially stretched resin film.

(III) Separately from the above, 47 mass % of a propylene homopolymer (product name: Novatec PP MA3Q, produced by Japan Polypropylene Corporation) and 53 mass % of light calcium carbonate particles (product name: Kalfain YM23, produced by Maruo Calcium Co., Ltd.) were mixed to prepare a resin composition b.

This resin composition was melted and kneaded in an extruder set at 250° C., extruded in a film form from the die on one side of the longitudinally uniaxially stretched film, and laminated thereon to obtain a first surface layer/core layer laminate (b/a).

Further, using a different extruder, the resin composition b was melted and kneaded in the extruder set at 250° C., extruded in a film form from the die, and laminated on the surface of the laminate (b/a) on the side of the core layer (a). As a result, a laminate with a three-layer structure of first surface layer/core layer/second surface layer (b/a/b) was obtained.

The laminate with a three-layer structure was guided to a tenter oven, heated to 150° C., and then stretched 8 times in the transverse direction using a tenter. Subsequently, the laminate was heat-set (annealed) at 165° C. and cooled to 60° C., and the edges were slit to obtain a thermoplastic resin film with a thickness of 110 µm as a substrate (1).

Test Examples

Example 1

As the isobutylene maleic anhydride copolymer, "Isobam-04" (product name), produced by Kuraray Co., Ltd., was used, and ground in a bead mill to obtain plate-like particles with an average particle size (D50) of 3.6 µm.

20 parts of cation-modified urethane resin ("Superflex 620" (product name), produced by DKS Co., Ltd.) was mixed based on 100 parts of the ground isobutylene maleic anhydride copolymer particles, and water was added thereto so that the solids concentration was 20 mass %, followed by stirring at 20° C. and 500 rpm for 10 minutes, thereby producing a dispersion.

Next, the dispersion was applied to the surface of the substrate (1) obtained in Production Example 1 using a bar coater so that the coating mass after drying was 2.0 g/m² and the thickness of the binding part was 2.0 µm.

Thereafter, drying was performed at 70° C. for 2 minutes, thereby obtaining a layered product comprising a release layer.

Example 2

A dispersion was produced in the same manner as in Example 1, except for using 150 parts of cation-modified urethane resin, and the obtained dispersion was used to produce a layered product.

Example 3

A dispersion was produced in the same manner as in Example 1, except for using 900 parts of cation-modified urethane resin, and the obtained dispersion was used to produce a layered product.

Example 4

A dispersion was produced in the same manner as in Example 1, except that the grinding conditions of "Isobam-04" (product name), produced by Kuraray Co., Ltd., which is an isobutylene maleic anhydride copolymer, were changed to obtain plate-like particles with an average particle size (D50) of 13.8 µm, and the obtained dispersion was used to produce a layered product.

Example 5

A dispersion was produced in the same manner as in Example 4, except for using 150 parts of cation-modified urethane resin, and the obtained dispersion was used to produce a layered product.

Example 6

A dispersion was produced in the same manner as in Example 4, except for using 900 parts of cation-modified urethane resin, and the obtained dispersion was used to produce a layered product.

Example 7

A dispersion was produced in the same manner as in Example 1, except for using a styrene maleic anhydride copolymer ("XIRAN 1000P" (product name), produced by Polyscope) in place of the isobutylene maleic anhydride copolymer, and the obtained dispersion was used to produce a layered product.

Example 8

A dispersion was produced in the same manner as in Example 7, except for using 150 parts of cation-modified urethane resin, and the obtained dispersion was used to produce a layered product.

Comparative Example 1

A dispersion was produced in the same manner as in Example 7, except for using 900 parts of cation-modified urethane resin, and the obtained dispersion was used to produce a layered product.

Comparative Example 2

A layered product was produced in the same manner as in Example 1, except that no cation-modified urethane resin was used, and an isobutylene maleic anhydride copolymer neutralized with ammonia was dissolved in water for use.

For the layered products of Examples 1 to 8 and Comparative Examples 1 and 2, the proportion of the carboxylic anhydride-modified olefin resin in the release layer, the actual acid value, the film thickness of the binding part, and the surface roughness SRa were measured, and deinking properties were evaluated. The results are shown in Table 1.

TABLE 1

| | Carboxylic anhydride-modified olefin resin | | | | Thermoplastic resin | | Layered product | | | | Evaluation | | |
|---|---|---|---|---|---|---|---|---|---|---|---|---|---|
| | Isobutylene maleic anhydride copolymer (parts) | Styrene maleic anhydride copolymer (parts) | Particle size (µm) | Acid value (mg KOH/g) | Cation-modified urethane resin (parts) | Viscosity of dispersion (mPa·s) | Film thickness of binding part (µm) | Proportion of carboxylic anhydride-modified olefin resin in release layer (%) | Actual acid value of release layer (mg KOH/m²) | Surface roughness SRa (µm) | Deinking properties (alkali) 20° C., 20 min | 40° C., 20 min | Water resistance |
| Example 1 | 100 | — | 3.6 | 728 | 20 | 100 | 2.0 | 68.8 | 1001.7 | 0.51 | A | A | 3 |
| Example 2 | 100 | — | 3.6 | 728 | 150 | 22 | 2.0 | 33 | 480.5 | 0.38 | A | A | 3 |
| Example 3 | 100 | — | 3.6 | 728 | 900 | 10 | 2.0 | 8.3 | 120.8 | 0.26 | B | A | 3 |
| Example 4 | 100 | — | 13.8 | 728 | 20 | 82 | 2.0 | 68.8 | 1001.7 | 1.49 | A | A | 3 |
| Example 5 | 100 | — | 13.8 | 728 | 150 | 15 | 2.0 | 33 | 480.5 | 0.72 | A | A | 3 |
| Example 6 | 100 | — | 13.8 | 728 | 900 | 9 | 2.0 | 8.3 | 120.8 | 0.30 | B | A | 3 |
| Example 7 | — | 100 | 3.0 | 475 | 20 | 103 | 2.0 | 68.8 | 653.6 | 0.46 | A | A | 3 |
| Example 8 | — | 100 | 3.0 | 475 | 150 | 30 | 2.0 | 33 | 313.5 | 0.32 | B | A | 3 |
| Comparative Example 1 | — | 100 | 3.0 | 475 | 900 | 14 | 2.0 | 8.3 | 78.9 | 0.25 | C | B | 3 |
| Comparative Example 2 | 100 | — | — | 728 | — | 600 | 2.0 | 100 | 1456 | 0.22 | A | A | 1 |

The results of Table 1 revealed that in Examples 1 to 8, when alkaline treatment was performed at 40° C. for 20 minutes, all of them had a printed layer removal percentage of 95% or more, and when alkaline treatment was performed at 20° C. for 20 minutes, the removal percentage was 70% or more, confirming excellent releasability. In contrast, in Comparative Example 1, when alkaline treatment was performed at 40° C. for 20 minutes, 70% or more of the printed layer could be removed; however, when alkaline treatment was performed at 20° C. for 20 minutes, removal was insufficient.

It was also revealed that Comparative Example 2 showed good releasability after alkaline treatment, whereas the water resistance of the release layer was insufficient; however, the water resistance was improved in all of Examples 1 to 8.

Although the present invention has been described in detail and with reference to specific embodiments, it is clear to those skilled in the art that various changes and modifications can be made without departing from the spirit and scope of the present invention. The present application is based on the Japanese patent application (No. 2021-061176) filed on Mar. 31, 2021, the entire content of which is incorporated herein by reference.

REFERENCE SIGNS LIST

1 Layered product
3 Substrate
5 Release layer
11 Carboxylic anhydride-modified olefin resin
12 Binding part
$T_a$ Average particle size of carboxylic anhydride-modified olefin resin
$T_b$ Thickness of binding part

The invention claimed is:

1. A layered product comprising a release layer on a substrate,
the release layer comprising a granular carboxylic anhydride-modified olefin resin and a binding part containing an acid group-free thermoplastic resin,
the carboxylic anhydride-modified olefin resin having an average particle size of 0.5 to 20 µm, the binding part having a thickness of 0.25 to 20 µm, and the release layer having an actual acid value of 100 mg KOH/m² or more.

2. The layered product according to claim 1, wherein an acid value when the carboxylic anhydride-modified olefin resin is ring-opened by hydrolysis is 400 mg KOH/g or more.

3. The layered product according to claim 1, wherein the proportion of the carboxylic anhydride-modified olefin resin in the release layer is 5 to 75 mass %.

4. The layered product according to claim 1, wherein the thickness of the binding part relative to the average particle size of the carboxylic anhydride-modified olefin resin is 0.1 times or more.

5. The layered product according to claim 1, wherein the substrate comprises a polyolefin resin.

6. The layered product according to claim 1, wherein the thermoplastic resin is a water-soluble polymer or a water-dispersible polymer.

7. The layered product according to claim 1, which is in the form of a film.

8. A printed matter having a printed layer on the release layer of the layered product according to claim 1.

9. A method for producing the layered product of claim 1, the method comprising applying an aqueous dispersion to a substrate followed by drying to form the release layer of the product of claim 1.

* * * * *